United States Patent [19]

Havewala et al.

[11] Patent Number: 5,711,779
[45] Date of Patent: *Jan. 27, 1998

[54] METHOD FOR FORMING ZINC PHOSPHATE BASED GLASSES

[75] Inventors: Noshir B. Havewala, Corning; Kevin T. Morris, Hammondsport; Michelle D. Pierson, Painted Post; Robert D. Shoup, Hammondsport, all of N.Y.

[73] Assignee: Corning Incorporated, Corning, N.Y.

[*] Notice: The term of this patent shall not extend beyond the expiration date of Pat. No. 5,482,526.

[21] Appl. No.: 178,418

[22] Filed: Feb. 17, 1994

[51] Int. Cl.⁶ .............................. C03B 5/16; C01B 15/16; C01B 25/26; C03C 3/17
[52] U.S. Cl. .................. 65/134.1; 65/135.9; 501/48; 501/76; 423/305; 423/309; 423/314
[58] Field of Search ........................ 65/21.1, 21.2, 65/27, 134.1, 135.9, 136.1, 85; 501/45, 48, 76; 423/306, 309, 305, 314

[56] References Cited

U.S. PATENT DOCUMENTS

| 2,601,395 | 6/1952 | Hatch. | |
| 3,284,368 | 11/1966 | Hatch. | |
| 3,360,332 | 12/1967 | Fuchs et al. | 2/106 |
| 3,838,998 | 10/1974 | Matthews et al. | 65/21.2 |
| 3,897,236 | 7/1975 | Roberts | 71/1 |
| 4,026,691 | 5/1977 | Lovett et al. | 65/27 |
| 4,049,779 | 9/1977 | Ropp | 423/309 |
| 4,087,511 | 5/1978 | Ropp | 423/277 |
| 4,126,665 | 11/1978 | Ropp | 423/314 |
| 4,326,873 | 4/1982 | Reilly et al. | 65/134.1 |
| 4,360,625 | 11/1982 | Griffith | 423/306 |
| 4,526,765 | 7/1985 | Ito et al. | 423/306 |
| 4,846,853 | 7/1989 | Chang et al. | 423/309 |
| 4,940,677 | 7/1990 | Beall et al. | 501/45 |
| 5,043,369 | 8/1991 | Bahn et al. | 523/466 |
| 5,162,267 | 11/1992 | Smith | 501/45 |
| 5,328,874 | 7/1994 | Beall et al. | 501/45 |
| 5,385,593 | 1/1995 | Longobardo | 65/134.3 |
| 5,482,526 | 1/1996 | Havewala et al. | 65/134.1 |

*Primary Examiner*—Steven P. Griffin
*Attorney, Agent, or Firm*—Milton M. Peterson

[57] ABSTRACT

A method for the manufacture of phosphate glass comprising forming an aqueous slurry by mixing phosphoric acid, a zinc compound and other batch materials in the required proportions, heating the batch slurry to produce a molten phosphate glass that exhibits a $P_2O_5/ZnO$ weight ratio range between about 1.2 to 2.0, and cooling the molten phosphate glass to room temperature.

7 Claims, 4 Drawing Sheets

METHOD FOR FORMING ZINC PHOSPHATE BASED GLASSES

RELATED APPLICATION

U.S. patent application Ser. No. 08/178,417, which is now U.S. Pat. No. 5,982,526, filed concurrently herewith by N. B. Havewala et al. under the title "Method for Forming a Non-Hygroscopic Zinc-Phosphate Compound", and assigned to the same assignee as the present application.

FIELD OF THE INVENTION

This invention relates to a novel method of forming a zinc phosphate glass and more particularly, the invention relates to a method wherein the zinc phosphate glass is formed directly from a batch slurry capable of producing a zinc phosphate glass of a desired composition.

BACKGROUND

A new family of materials was disclosed in U.S. Pat. No. 5,043,069 (Bahn et al.). That patent describes the co-extrusion of high temperature polymers with low temperature phosphate glasses and the subsequent injection molding of the glass-polymer materials. The glasses utilized, by necessity, were required to have low softening points which permitted low mixing/extrusion temperatures, i.e., below about 400° C. Glasses having base compositions within the general zinc phosphate system were found to be especially suitable for the glass component of these glass-polymer alloys; they exhibited low melting temperatures in the 900°–1000° C. range, softening points below about 500° C., and transition temperatures below about 450° C. Illustrative of such glasses is that glass composition system disclosed in U.S. Pat. No. 4,940,677 (Beall et at.).

The usual process in the prior art preparation of zinc-phosphate glasses is to mix selected dry batch materials together in the desired proportions and to heat the dry batch to elevated temperatures in order to form a melt. Because a pulverized material is usually desired to form feedstock for mixing with the polymer to form the alloys, the melts were typically poured through patterned metal rollers to produce a textured surface which was easily crushed to predetermined-sized fragments; or more preferably, the melts were poured as a fine stream into a bath of cold water, a practice termed "drigaging". In addition, the glass particles/fragments were sometimes pelletized for ease of handling. The resulting glass particles were then mixed with the desired polymer and processed according to desired end uses.

Although good quality glass could be and was produced using this prior art method of forming the glass, the search has been continuous for glass formation methods which result in a better quality glass, i.e., a more homogeneous glass exhibiting a lesser seed concentration. This search led to the use of "wet batching" techniques; specifically solution processes wherein the batch chemicals are totally soluble in an acidic solution, such as commercially available phosphoric acid, or in a solution provided by dissolving $P_2O_5$ in water. However, not only were the batch materials prohibitively expensive, this method produced noxious gases associated with the thermal decomposition of the desired soluble salts, e.g., halides, nitrates and sulfates utilized in forming the batch solution. As a result of this cost and the need for pollution control devices, other "wet batch" methods were sought as an alternative to the available dry batching technique.

2

SUMMARY OF THE INVENTION

Hence, the instant invention in its broadest form is directed to a method for the manufacture of phosphate glass comprising three basic steps; first, forming an aqueous slurry by intimately mixing a mixture containing phosphoric acid, a zinc-containing compound and the necessary batch materials in the required proportions, whereby the so-formed batch slurry is homogeneous, capable of producing a phosphate glass of a desired composition and exhibits a $P_2O_5/ZnO$ weight ratio range between about 1.2 to 2.0; second, heating the so-formed batch slurry to a temperature and for a time sufficient to produce a molten phosphate glass; and third, cooling the molten phosphate glass to room temperature.

Alternatively, the method may involve forming an aqueous slurry by intimately mixing a mixture containing phosphoric acid and a zinc-containing compound, wherein the slurry mixture is comprised of a mixture of zinc hydrogen phosphates and exhibits a $P_2O_5/ZnO$ weight ratio of about between 1.2 to 2.0. Thereafter, the necessary batch materials in the required proportions are added to the aqueous slurry mixture and the entire so-formed batch slurry mixture is intimately mixed to assure that the batch slurry is essentially homogeneous; the so-formed batch slurry is capable of producing a phosphate glass of a desired composition. This batch slurry is thereafter heated in the same manner.

DETAILED DESCRIPTION OF THE INVENTION

Throughout this disclosure the reference to a zinc-phosphate glass shall refer to a glass composition within the scope of compositions essentially disclosed in either U.S. Pat. No. 4,940,677 (Beall et al.) or U.S. Pat. No. 5,328,874, (Beall et al.) and assigned to the same assignee as the subject application. Specifically, on one hand, the desired phosphate glass is within the composition range that consists essentially, expressed in terms of mole percent on the oxide basis, of at least 65% total of 10–55% ZnO, 28–40% $P_2O_{5l}$, 10–35% $R_2O$. The $R_2O$ amount consists of at least two alkali metal oxides in the indicated proportions selected from the group consisting of 0–25% $Li_2O$, )0–25% $Na_2O$, and 0–25% $K_2O$. Additionally included within the composition range may be up to 35% total of optional ingredients in the indicated proportions selected from the group consisting of 0–10% $Al_2O_3$, 0–15% $B_2O_3$, 0–15% $Cu_2O$, 0–25% $Sb_2O_3$, 0–35% PbO, 0–35% SnO, 0–5% $ZrO_2$, 0–4% $SiO_2$, 0–20% MgO, 0–20% CaO, 0–20% SrO, 0–20% BaO and 0–10% MnO, 0–10% $WO_3$, 0–10$MoO_3$, 0–5% rare earth metal oxide and 0–5% F, as analyzed in weight percent. In addition, the amount of $Al_2O_3+B_2O_3$ should not exceed 15%, the amount of $WO_3+MoO_3$ should not exceed 15%, and amount of MgO+CaO+SrO+BaO+MnO should not exceed 20%.

On the other hand, the composition is within the composition range consisting essentially, expressed in terms of mole percent on the oxide basis, of 15–35% $P_2O_5$, 0–25% $SO_3$, 30–55% ZnO, and 0–25% $R_2O$. The $R_2O$ amount is selected from the group consisting of 0–25% $Li_2O$, 0–25% $Na_2O$, and 0–25% $K_2O$. Included in the composition range may be up to a total of 15% of optional ingredients in the indicated proportions selected from the group consisting of 0–10% $Al_2O_3$, 0–10% MgO, 0–10% CaO, 0–10% Sro, 0–10% BaO, 0–10% MnO, 0–10% transition metal oxides and 0–15% Cl+F, as analyzed in weight percent.

As contemplated by the method of this invention, an aqueous slurry mixture is formed by intimately mixing a mixture containing phosphoric acid and a zinc-containing compound. This aqueous slurry formed by the intimate mixing is comprised of a mixture of zinc hydrogen phosphates and exhibits a $P_2O_5$/ZnO weight ratio ranging from 1.2 to 2.0.

For the purposes of this invention, the phosphoric acid may be in the form of ortho, meta, pyro, hydro or anhydrous phosphoric acid. Any convenient or available source of phosphoric acid may be used. In general, ortho phosphoric acid is widely available and is a convenient form for use in accordance with this invention. It is usually sold in the form of an aqueous solution, e.g., 85% ortho phosphoric acid.

The zinc compound suitable for purposes of the invention may be in the form of any zinc salt including, zinc oxide, zinc chloride, zinc nitrate, zinc ortho/pyrophosphate or any other compound which, upon being combined with the phosphoric acid, will form an appropriate slurry mixture which will ultimately, when combined with proper batch materials, result in the formation of the desired zinc-phosphate based glass. However, since batch homogeneity is a concern, and since it is preferable to avoid noxious gases associated with the thermal decomposition of zinc salts such as zinc chloride, zinc nitrate, etc., finely divided zinc oxide exhibiting a particle size range of between 0.044 mm (325 mesh) to 0.17 mm (80 mesh) is the preferred source.

Specifically, the phosphoric acid and the zinc materials are combined together in the appropriate proportions and intimately mixed in order to obtain the desired essentially homogeneous slurry mixture comprised of a mixture of zinc hydrogen phosphates. As disclosed in the earlier-mentioned co-pending application, Havewala et at., the mixing of phosphoric acid and the zinc compound initiates an exothermic reaction resulting in the formation of the compounds represented by the following chemical formulas: $ZnH_4P_2O_8 \cdot 2H_2O$, $Zn(HPO_4) \cdot H_2O$.

It is believed that this reaction of the phosphoric acid and the zinc compound to form the hydrated zinc phosphates, assuming use of the preferred compound ZnO, may be represented by, but not necessarily limited to, the following equation:

$3H_3PO_4 + 2ZnO + H_2O \cdot ZnH_4P_2O_8 \cdot 2H_2O + Zn(HPO_4) \cdot H_2O$.

While continuing the aforementioned intimate mixing of the intermediate slurry mixture, the necessary batch materials in the required proportions are directly added to this aqueous slurry mixture. It is preferred that the dry batch materials be thoroughly premixed prior to addition to slurry mixture; once premixed, the batch materials are slowly added to the slurry mixture. It is imperative to note that the so-formed batch slurry, comprising the added batch materials, should be capable of producing a phosphate glass of a desired composition. Preferably, the desired composition should be within the range of compositions defined above as a zinc-phosphate glass. The actual batch ingredients used can comprise any materials, either the oxides, carbonates, chlorides or other compounds, which, upon being mixed together in a slurry and heated to the appropriate temperature to form a glass, will be convened into the desired oxides in the proper proportions. For example, $Li_2CO_3$ may be conveniently employed as the source of $Li_2O$.

It is contemplated that the dry batch materials could be premixed and added simultaneously with the ZnO powder to form a batch slurry directly, thus avoiding the formation of the slurry mixture comprised solely of a mixture of various zinc phosphate compounds.

Once the appropriate batch materials have been added, either after or simultaneously with the zinc compound, the intimate mixing of the so-formed batch slurry should continue until the batch slurry has become an essentially homogeneous mixture.

Once a homogeneous batch slurry is achieved, this batch slurry should then be heated to a temperature and for a time sufficient to directly form a molten phosphate glass; preferably the resultant glass is prepared in particle form rather than in glass slab form. It has been determined that the batch slurry mixture should be heated to at least 600° C. in order to generate sufficient vitrification of the batch slurry to form the glass. This lower melting temperature, when compared to standard dry hatched phosphate glasses, is possible due, in part, to the more intimate mixing of the fine powders with the zinc- phosphoric acid shrry than is possible in conventional glassmaking procedures utilizing dry batch materials.

Figure 1:
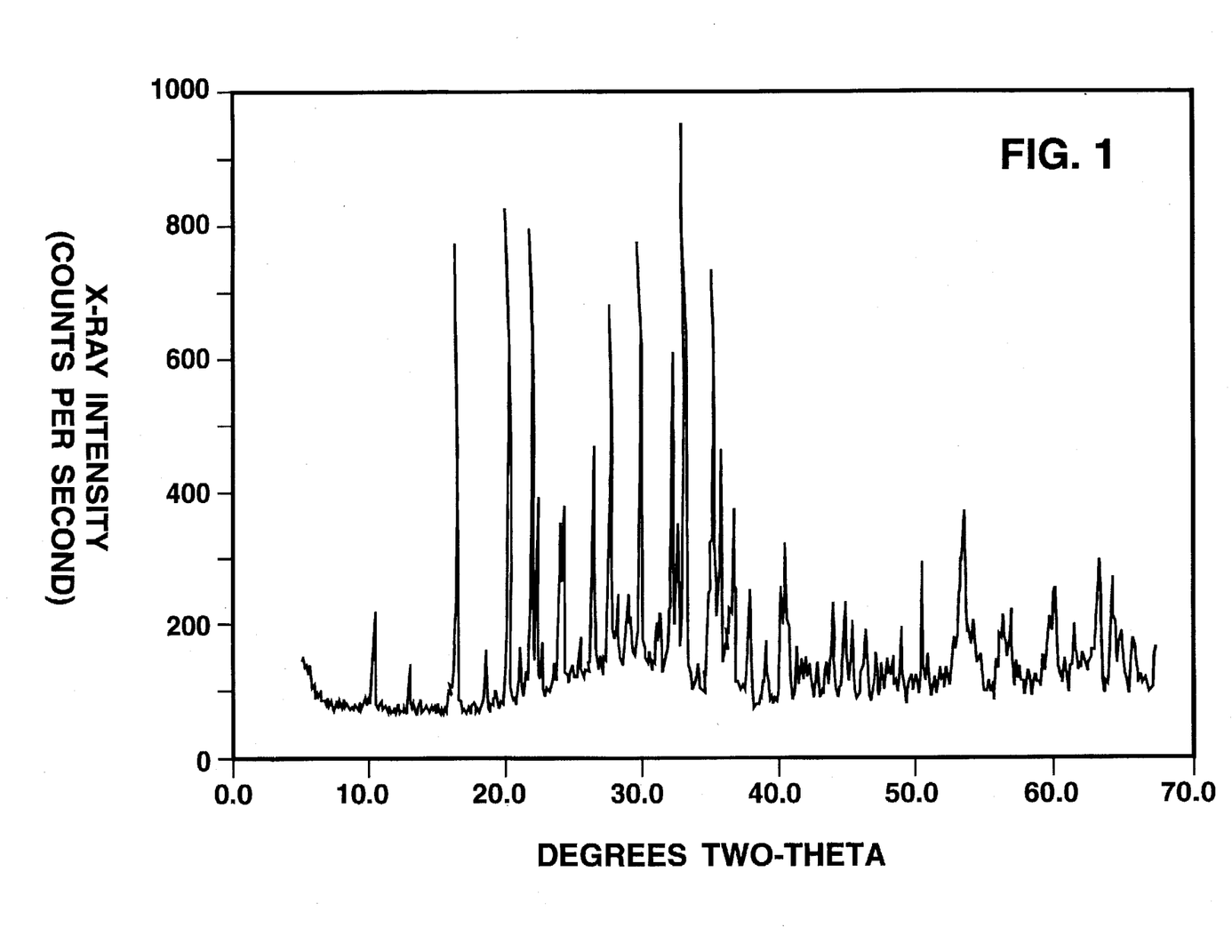
FIGS. 1–4 illustrate the resulting X-ray diffraction patterns of the slurry material when heated to 200°, 400°, 600° and 750° C., respectively.
Figure 2:
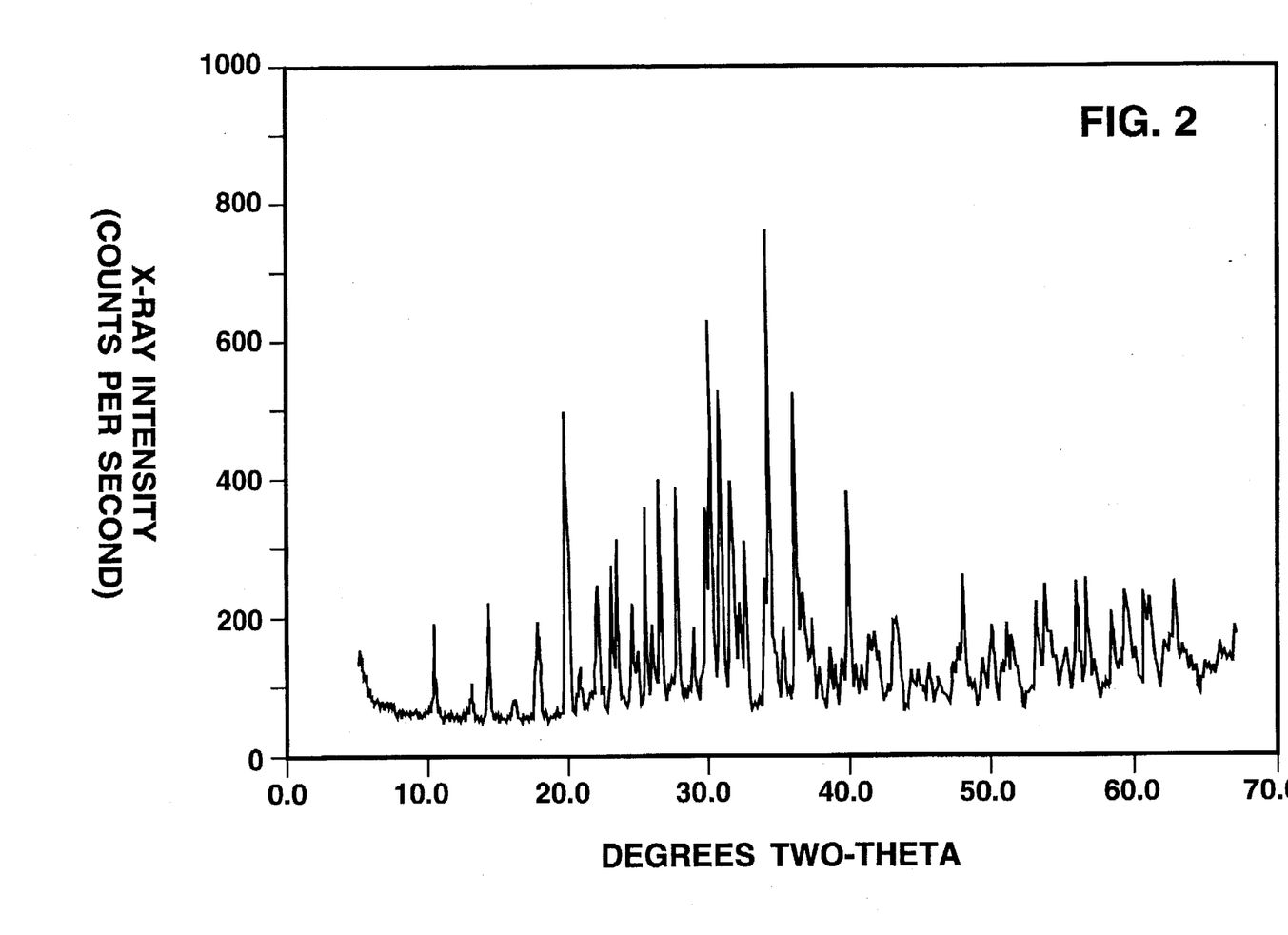
Figure 3:
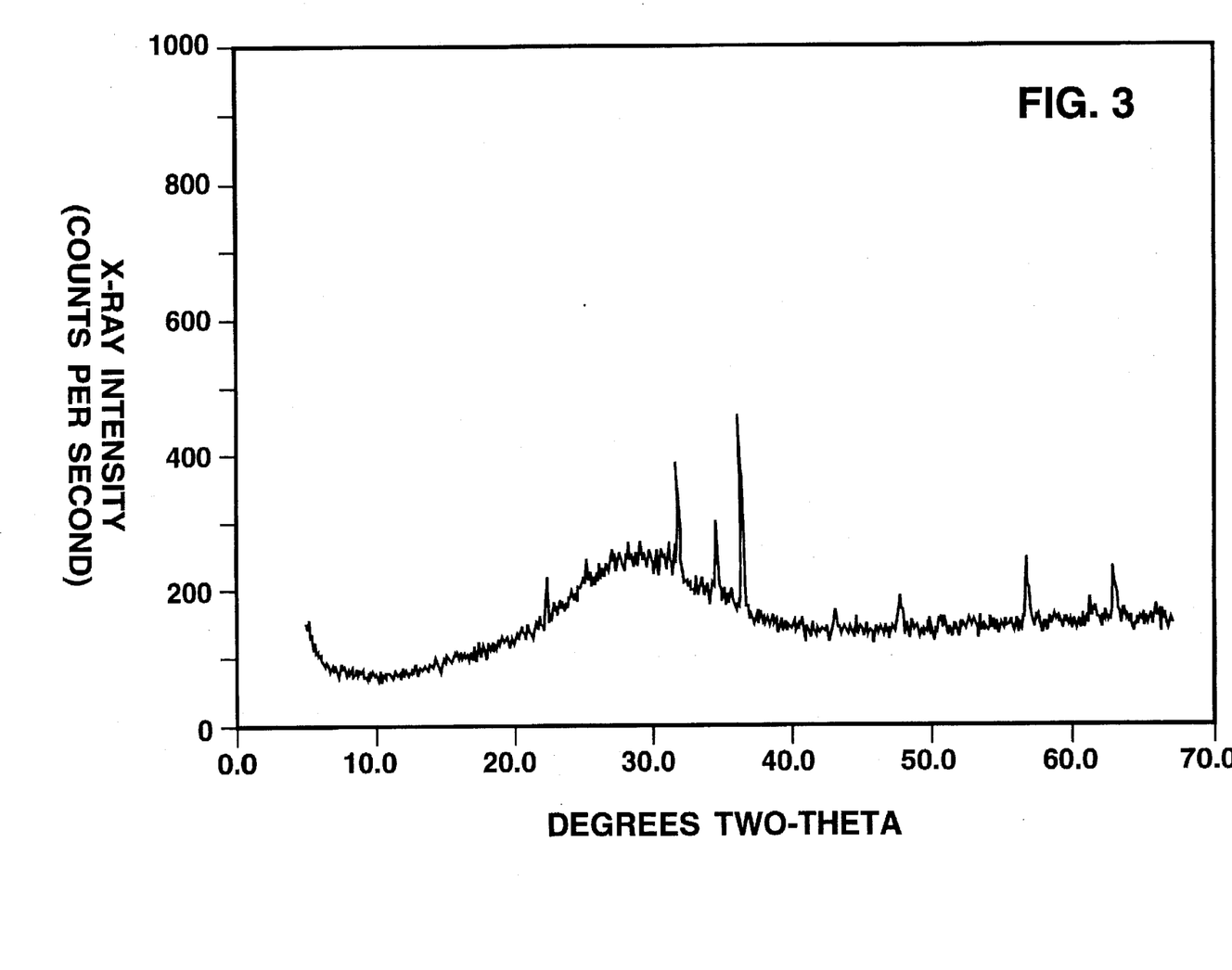
Figure 4:
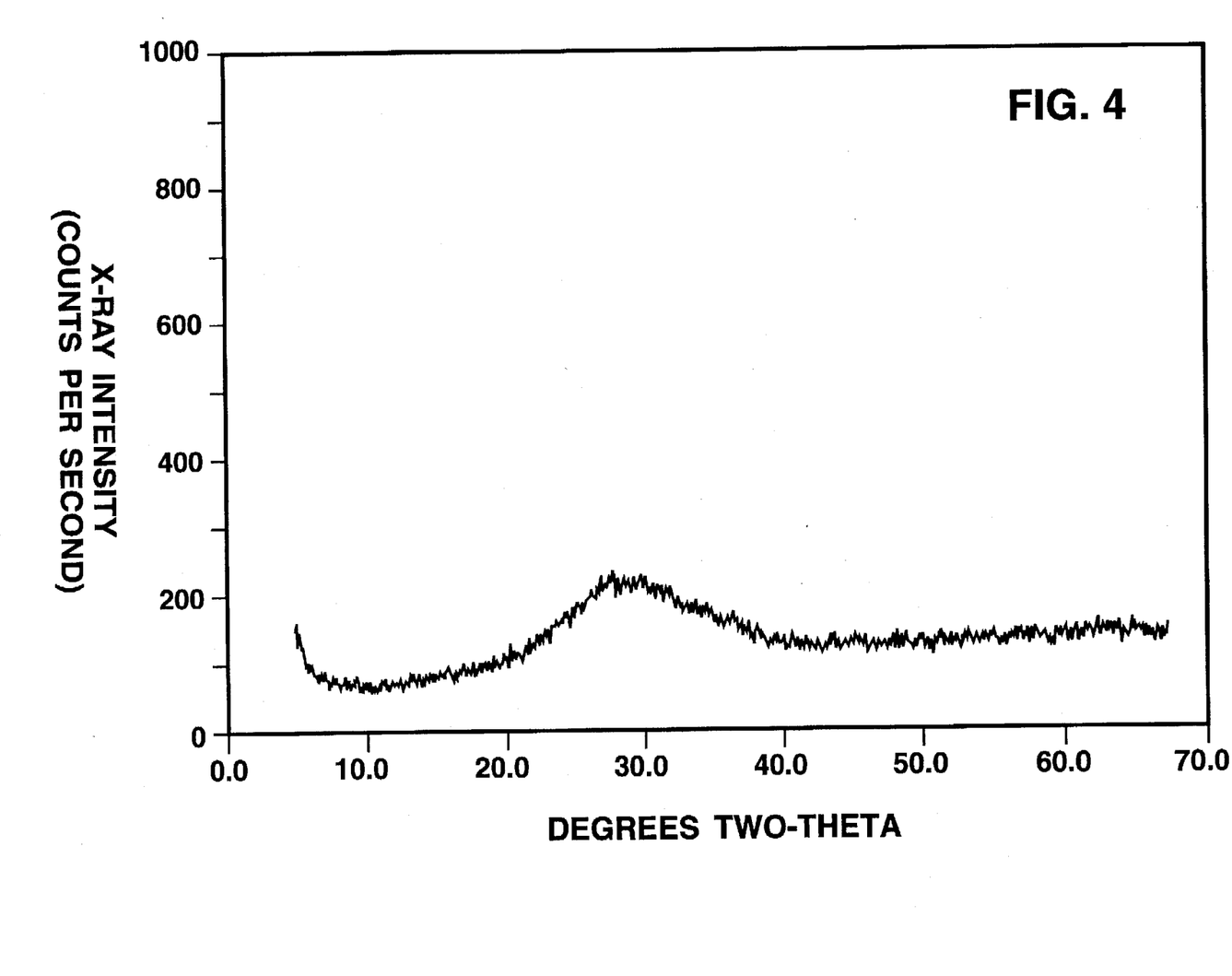

Preferably, the batch flurry should be heated to at least 750° C. Four identically prepared slurry samples capable of producing glasses within the compositions described above were heated for 2 hours at 200°, 400°, 600°, and 750° C., viz., test samples $t_1$-$t_4$, respectively. The test samples were evaluated for water content (weight %), transition temperature ($T_g$) in °C., and crystallinity, with the results being reported in Table I and FIGS. 1–4. The FIGS. comprise X-ray diffraction patterns of the various test samples; those patterns revealing that the slurry batch is predominantly crystalline at both 200° and 400° C. Although significant glass formation occurred by 600° C., good quality glass was not produced until the heating of the slurry to 750° C.

In the most preferred embodiment, in order to produce good quality glass, preferably in particle form, it is necessary to heat this glass batch slurry to a temperature of approximately at least 750° C., but not greater than 1200° C., for periods of as long as 1 minute to as short as 10 seconds; obviously, the higher the formation temperature the shorter the formation time required. Good quality zinc phosphate glass is defined as a glass which is transparent with no occluded particles or crystalline phases and exhibiting a very low water content, approximately 0.015%, and an acceptably low and reproducible transition temperature ($T_g$), approximately less than about 400° C. The advantage of this direct formation of glass particles is that it opens up the possibility of a continuous process for the formation of the aforementioned glass polymer materials. It is contemplated that the glass particles, when cooled to a temperature approximately that of the molten polymer, could be directly added to the molten polymer and compounded to form the glass polymer alloys. In other words, a continuous process is envisioned for the formation of glass/polymer materials that would eliminate the tank melting and particle forming steps that are currently required to produce the desired particulate glass for combining with the polymer.

TABLE I

|  | $t_1$ | $t_2$ | $t_3$ | $t_4$ |
| --- | --- | --- | --- | --- |
| $T_g$ | — | 261 | 334 | 343 |
| Water (%) | 4.2 | 0.39 | 0.0001 | 0.0001 |

On the other hand, if a glass slab is formed from the slurry within the desired zinc phosphate glass composition range, the molten phosphate glass should be cooled to room temperature and thereafter formed into glass particles; formation temperature and time ranges would be the same as those described above. Formation of the glass particles includes drigaging of the glass to obtain glass particles of a desired particle size range of about between 270 mesh (0.053 mm) and 20 mesh (0.841 mm) and alternatively, glass particles of the desired particle size range could be obtained by crushing the cooled glass article to the appropriate particle size. In either case, the glass particles could then be used as raw materials in a conventional tank melting operation to form a zinc phosphate glass. The advantage of using the slurry mixing prior to the conventional tank melting is that the glass obtained shotfid exhibit a better homogeneity than the glass formed utilizing dry batching and subsequent tank melting.

In another embodiment, the batch slurry is dried at a temperature and for a time sufficient to substantially remove the water, thereby resulting in a essentially homogenous semi-dry batch mixture. Preferably, the batch slurry should be heated to at least 300° C. for a period of 90 min. in order to result in semi-dry batch mixture which is sufficiently dry for forming glass therefrom; the lower the water content the less water which needs to be driven off during the heating step.

After obtaining a homogeneous semi-dry batch mixture possessing the requisite moisture content, the semi-dry batch mixture is heated to a temperature and for a time sufficient to produce a molten phosphate glass in the same manner as described above.

Alternatively, the drying step of the batch slurry disclosed above may be achieved through a two step process with the intent of forming direct particles of the slurry and ultimately direct formation of the glass particles. The first step comprises spray drying the so-formed batch slurry resulting in semi-dry batch particles which exhibit a low moisture/water content, followed by fluidized bed drying. The spray drying is conducted in a manner such as to yield particles which are sufficiently large to avoid agglomeration and/or dusting during the subsequent fluidized bed drying, but not so large as to be inefficiently operative in the fluidized bed drying process. Accordingly, a particle size of about 0.05 mm has been deemed practical minimum with a practical maximum size of about 10 mm.

For the subsequent fluidized bed drying step to work successfully, the moisture content of the semi-dry particles as a result of the spray dryer will be about 10–12%. If the moisture content is above this value, the glass particles will be too wet and they will likely agglomerate in the fluidized bed. It has been determined that, in order to achieve this desired moisture content, it is necessary to maintain a spray dryer nozzle/outlet temperature of at least above 175° C.

Once the semi-dry batch mixture is spray dried to the above specifications, the second step involves placing these semi dry batch particles in a fluidized bed and drying the particles. The resulting material is a semi-dry batch mixture comprised of semi-dry batch particles which exhibit a moisture/water content of no greater than about 5%; however, less than this is preferred because the less water remaining in the particles the less water which has to be driven off during the actual glass formation. Operation of the fluidized bed at temperatures of about at least 400° C., coupled with a residence time of about one hour, is necessary in order to remove the remainder of the water to achieve a material with the desired moisture content.

Again, as described above, the semi-dry batch mixture comprised of semi-dry batch particles can then be heated to a temperature and for a time sufficient to form glass particles. Preferably, the method of heating the dry batch particles should be such that the resultant glass particles exhibit a particle size similar to that produced by a typical drigaging operation, i.e., particles ranging from about 200 mesh (0.053 mm) to 20 mesh (0.841 mm). As described above, it is necessary to heat these semi-dry batch particles to a temperature of at least approximately 750° C. in order to form glass particles. It is contemplated that glass particles could be formed from semi-dry batch particles in times ranging from 10 secs. to 1 min. and temperatures ranging from 1200° to as low as 750° C. to repeat, the higher the formation temperature the shorter the formation time required.

Although glass particles are not being directly formed from the slurry (intermediate spray drying and drying steps are necessary), the resultant glass once cooled, although in particle form, could again be used as homogeneous batch materials for use in large volume tank melts, thereby resulting in a better quality glass, i.e, a better homogeneity, rapid melting and a lower seed count. Again, the major difference is that the direct formation of glass particles would be advantageous in that crushing or drigaging would be eliminate. It should be reiterated that an advantage of direct glass particle formation is that it opens up the possibility of the aforementioned continuous process for the formation of glass polymer materials, i.e, glass particles of the proper temperature could be directly added to the molten polymer and compounded to form the glass polymer alloys.

The following examples are intended to illustrate the invention without being deemed limitalive thereof:

EXAMPLE 1

A slurry capable of forming the following glass composition (as batched in weight percent) was intimately mixed together: 46.5% $P_2O_5$, 2.02% $Al_2O_3$, 2.08% $Li_2O$, 4.92 $N_2O$, 4.68% $K_2O$, 7.48% SnO and 37.3% ZnO. Once the slurry was completely mixed and a homogeneous slurry mixture obtained, the slurry mixture was then poured into a fused silica tube designed to resemble a sink pipe; i.e., the slurry flowed over the bend and collected in an area where the slurry could pool and melt. While in the fused silica tube furnace, the slurry was heated to temperature and for a time sufficient to directly form glass. Specifically, the glass had a residence time of approximately 15 min. in the pool area, which was sufficient to form glass directly from the slurry. The so-formed molten glass then exited the silica tube furnace and was thereafter drigaged, resulting in glass particles exhibiting a particle size ranging from 200 mesh (0.053 mm) to 20 mesh (0.841 mm). TABLE II reports the temperature to which the slurry was heated to in order to form glass (Form. temp.); also reported therein is the water content ($H_2O$ content), reported in weight percent, of the so-formed glass and transition temperature ($T_g$). The glass so-formed from the slurry was a clear, good quality glass.

TABLE II

| Example | Form. temp (°C.) | $H_2O$ content (ppm) | $T_g$ |
| --- | --- | --- | --- |
| 1 | 1200 | 0.035 | 326.2 |

EXAMPLE 2

Phosphoric acid was formed by dissolving 25.56 g. of $P_2O_5$ in 100 cc of water. A solution was then formulated by dissolving into 50 cc of water the following ingredients: 3.99 g. NaOH, 7.84 g. KOH and 3.30 g. NaAlO$_2$. The phosphoric acid and the solution were mixed together and thereafter combined with a solution which was comprised of 2.88 g. LiOH dissolved in 30 cc H$_2$O. The entire mixture was then thoroughly stirred. Finally, 63.3 g. of zinc phosphate powder was added to the solution mixture, again coupled with strong stirring, to form a batch slurry mixture. The so-formed batch slurry mixture became somewhat thixotropic part way through the powder addition, but on further stirring formed a uniform slurry. This batch slurry mixture was heated at 80° C. to remove a portion of the water resulting in an easier formation of glass particles; less water to drive off during glass formation. Following removal of the water, the semi-dry mixture was placed in a silica crucible and heated to about 750° C. for approximately between 30 to 60 min. The melt produced a pourable homogeneous, good quality glass, i.e., that termed Example 2, the nominal/batch composition and the analyzed composition thereof being reported in TABLE III.

TABLE III

| Component | Analyzed weight percent | Nominal weight percent |
|---|---|---|
| P$_2$O$_5$ | 46 | 46.9 |
| Al$_2$O$_3$ | 1.76 | 2 |
| Li$_2$O | 1.86 | 1.8 |
| Na$_2$O | 3.8 | 4.4 |
| K$_2$O | 5.42 | 6.7 |
| ZnO | 36.8 | 37.3 |

EXAMPLE 3

A slurry was prepared by mixing about 76 g. orthophosphoric acid (85%:H$_3$PO$_4$) with 36.63 g of fine ZnO powder in a Ross Double Planetary mixer marketed by the Charles Ross & Sons Company, Hauppauge, N.Y.; specifically the zinc used was technical grade 399 sold by the Zinc Corporation of America, Monaca, Pa. The resulting acidic so-formed slurry was mixed sufficiently to produce an essentially homogeneous mixture.

A solution was then formed by dissolving the following materials, 7.84 g. KOH, 3.99 g NaOH, 3.3 g. NaAlO$_2$ and 2.88 g. LiOH in 30cc H$_2$O. That solution was admixed into the above slurry resulting in a dough-like paste which, upon heating to about 300°–400° C., was transformed into a crushable cake-like solid. This cake-like solid was further heated in air to 900° C. for about 30–60 minutes, again producing a good quality glass exhibiting an analyzed composition same as that of Example 2, earlier reported in TABLE III.

EXAMPLE 4

Orthophosphoric acid (86.6 g. of 85% H$_3$PO$_4$) was added to 51.44 g. ZnO powder and thereafter the mixture was continuously stirred for approximately 1 hour. While the stirring continued, a premixed powder mixture comprised of selected batch material additives was slowly added to the zinc-phosphate mixed slurry. Specifically, the premixed mixture was comprised of a mixture of the following batch material ingredients: 21.5 g. KPO$_3$, 17.78 g. NaPO$_3$, 11.38 g. SnO, 8.06 g. Li$_2$CO$_3$, and 3.18 g. SnO, 8.06 g. Li$_2$CO$_3$, and 3.18 g. Al$_2$O$_3$. The dough-like slurry paste or wet batch mixture was then heated to approximately above 900° C. for approximately one-half hour. A good quality glass, i.e., Example 4, was produced exhibiting an analyzed composition as reported in Table IV, a low water (~0.01%) and an acceptable Tg (<400° C.).

TABLE IV

| Component | Batched weight percent | Nominal weight percent |
|---|---|---|
| P2O5 | 47.2 | 46.8 |
| ZnO | 32.9 | 33.5 |
| Na2O | 5 | 4.83 |
| SnO | 6.8 | 7.26 |
| K2O | 4.7 | 4.49 |
| Li2O | 1.3 | 2.18 |
| Al2O3 | 2 | 2.19 |

EXAMPLES 5–9

A slurry was prepared by mixing 67.69 g. of 85% H$_3$PO$_4$ and 23.3 g. ZnO, with the initial slurry mixture thereafter continuously stirred for about 1 hour. A pre-mixed powder mixture comprised of preselected batch material additives was then slowly added to, and accompanied by continued stirring of, the intermediate slurry formed. This powder mixture was comprised of 1.88 g. Al$_2$O$_3$, 7.81 g. Na$_2$CO$_3$, 6.37 g. K$_2$CO$_3$, 5.47g. LiCl, 12.12 g. CaF$_2$. Due to the reaction of the carbonates in the acidic solution, CO$_2$ was liberated, thereby causing the batch to foam somewhat. The intermediate slurry-batch materials mixture, i.e., batch slurry, was heated in order to partially dry the mixture. This semi-dry batch mixture was then heated in a silica crucible to about 800° C. for about 1 hour. The resultant good quality glass, i.e., Example 5, was clear and exhibited a batched and analyzed composition as reported in Table V.

TABLE V

| Component | Batched wt. percent | Analyzed wt. percent |
|---|---|---|
| P$_2$O$_5$ | 45.4 | 45.4 |
| K$_2$O | 4.7 | 4.03 |
| Na$_2$O | 2.1 | 2.19 |
| Li$_2$O | 4.9 | 4.62 |
| Al$_2$O$_3$ | 2 | 1.36 |
| BaO | 11.5 | 11.4 |
| CaO | 4.2 | 4.05 |
| ZnO | 25.2 | 26.9 |
| F | — | 0.56 |
| Cl | — | 0.25 |

Table VI reports four additional compositions, as batched, (Examples 6–9) which were prepared using the same basic procedure outlined above for Example 5; i.e., addition of the selected batch materials (pre-mixed) to a prepared zinc phosphate slurry. One slight variation is that the glasses reported in this Table were heated to approximately 1000° C. to form the glass. All four examples produced good quality glass within the composition ranges disclosed above.

TABLE VI

| Component | 6 | 7 | 8 | 9 |
|---|---|---|---|---|
| H$_3$PO$_4$(85%) | 56.26 | 56.31 | — | 53.13 |
| H$_3$PO$_4$(80%) | — | — | 54.81 | — |
| Al$_2$O$_3$ | 1.35 | 1.42 | 1.47 | — |
| AlF$_3$ | — | — | — | 1.96 |
| BaCO$_3$ | — | — | — | 10.09 |
| CaF$_2$ | — | — | — | 3.92 |
| Li$_2$CO$_3$ | 3.00 | 3.59 | 3.71 | 3.55 |
| MoO$_3$ | 2.06 | — | — | — |
| K$_2$CO$_3$ | 6.61 | 4.84 | 5.01 | — |
| KF | — | — | — | 1.74 |
| KOH | — | — | — | 2.16 |
| K$_3$PO$_4$ | — | — | — | — |

TABLE VI-continued

| Component | 6 | 7 | 8 | 9 |
|---|---|---|---|---|
| $Na_2CO_3$ | 5.02 | 5.86 | — | — |
| NaCl | — | — | — | 5.55 |
| NaF | — | — | — | 0.59 |
| $Na_3PO_4$ | — | — | — | — |
| SnO | — | 5.07 | 5.24 | — |
| ZnO | 25.7 | 22.92 | 23.7 | 17.3 |

EXAMPLES 10–16

In order to demonstrate the ability of the method to directly produce glass particles, between about 100 to 150 grams of the above semi-dry batch mixture were added to a sufficient amount of 85% $H_3PO_4$ to form an acidic slurry. Approximately 40 ml. of $H_2O$ were added to the acidic slurry and mixed to produce a pourable and homogeneous slurry.

Droplets of the well stirred slurry exhibiting a particle size of approximately between 3–4 mm were placed on a Teflon sheet; a particle size representative of that particle size which could be produced by spray drying of the well stirred slurry. The particles were then heated to approximately 300° C. for a period of about ½hr.; representative of a typical fluidized bed drying step. Once sufficiently dried, these semi-dry particles were in turn placed into a Pt-lined melting apparatus and plunged into a controlled temperature furnace for various periods of time of up to one minute, in order to directly form glass. The droplets tended to flow together and formed a ¼" glass layer on the Pt-lined surface; 0.6 mm shards (particles) of good quality glass were removed from the surface Table VII reports the glass formation temperatures (Temp) and heating times in seconds (Time) at which direct glass formation was successfully carded out. In addition, Table VII reports the moisture content percent total weight (Water(%)), as measured utilizing the Karl Fisher titration method at 500° C., the drying temperature (D. Temp.) and the resultant transilion temperature ($T_g$) of the formed glass particles. Note that Examples 10 and 11 were not pre-dried by heating, i.e., calcined, prior to the heating to directly form the glass particles; rather, they were pre-dded at room temperature. The results indicate that heating pre-dried particles for as short a time as 10 seconds above about 990° C. produced good quality glass exhibiting water levels below about 0.01% (by weight) and acceptable transition temperatures ($T_g$) below about 350° C.

Table VIII reports the compositional analysis, both as hatched and as analyzed for Example C; i.e., dried at 300° C. and glass particle formation carded out at 993° C. for 10 seconds. The table reveals that the desired composition is maintained when using the direct glass particle formation method.

TABLE VII

|  | 10 | 11 | 12 | 13 | 14 | 15 | 16 |
|---|---|---|---|---|---|---|---|
| Temp. (°C.) | 1170 | 993 | 993 | 993 | 800 | 800 | 800 |
| Time (sec.) | 30 | 10 | 10 | 10 | 60 | 30 | 60 |
| D. Temp. (°C.) | — | — | 300 | 100 | 300 | 300 | 100 |
| Water (%) | 0.007 | 0.026 | <0.0005 | 0.004 | 0.028 | 0.036 | 0.032 |
| $T_g$ (°C.) | 331 | 331 | 318 | — | 320 | 310 | — |

TABLE VIII

| Component | Batched wt. % | Analyzed wt. % |
|---|---|---|
| $P_2O_5$ | 46.5 | 46.5 |
| ZnO | 32.3 | 32.4 |
| SnO | 7.48 | 7.78 |
| $Na_2O$ | 4.92 | 5.23 |
| $K_2O$ | 4.68 | 4.68 |
| $Li_2O$ | 2.08 | 2.1 |
| $Al_2O_3$ | 2.02 | 1.97 |

Whereas the above description reflects laboratory mixing, melting and forming practice only, it will be appreciated that the recited methods and compositions are capable of being utilized on a commercial scale. It is only necessary to ensure that the batch materials are sufficiently mixed together to form an essentially homogeneous slurry mixture which is then melted at temperatures which will ensure a homogenous melt without excessive volatilization of sulfide oxides, chloride and fluoride.

While this invention has been exemplified with respect to specific processing techniques and conditions, specific ingredients and amounts thereof, and utilities, all variations thereof obvious to one skilled in the art are intended to be included within the spirit and purview of this application and the scope of the appended claims.

We claim:

1. A process for the manufacture of a zinc phosphate glass comprising the steps of:
    (a) intimately mixing phosphoric acid and a zinc-containing compound in water to form a mixture of zinc hydrogen phosphates in an aqueous slurry, the slurry being essentially homogeneous and comprising $P_2O_5$ and ZnO in a weight ratio within the range of 1.2 to 2.0; and,
    (b) converting the so-formed slurry, directly or indirectly to a molten zinc phosphate glass; and
    (c) cooling the molten zinc phosphate glass.

2. The method as claimed in claim 1 wherein the converting of the slurry involves first drying the slurry at a temperature and a time sufficient to substantially remove the water to form an essentially homogeneous semi-dry mixture and thereafter further healing the semi-dry mixture to a temperature and for a time sufficient to produce a molten phosphate glass.

3. The method as claimed in claim 1 wherein said converting comprises spray drying the slurry to form semi-dry particles and placing the semi-dry particles in a fluidized bed to further dry the particles which are then heated to a temperature and for a time sufficient to form molten phosphate glass particles.

4. The method as claimed in claim 3 wherein the heating of the particles involves heating to a temperature in the range of 750°–1200° C. for a time in We range of one minute to 10 seconds.

5. The process as claimed in claim 1 wherein the zinc phosphate glass is within the composition range that consists essentially, expressed in terms of mole percent on the oxide basis, of at least 65% total of 10–55% ZnO, 28–40% $P_2O_5$, 10–35% $R_2O$, wherein $R_2O$ consists of at least two alkali metal oxides in the indicated proportions selected from the group consisting of 0–25% $Li_2O$, 0–25% $Na_2O$, and up to 35% total of optional ingredients in the indicated proportions selected from the group consisting of 0–10% $Al_2O_3$, 0–15% $B_2O_3$, 0–15% $Cu_2O$, 0–25% $Sb_2O_3$, 0–35% PbO, 0–35% SnO, 0–5% $ZrO_2$, 0–4% $SiO_2$, 0–20% MgO, 0–20%

CaO, 0–20% SrO, 0–20% BaO and 0–10% MnO, 0–10% $WO_3$, 0–10% $MoO_3$, 0–5% rare earth metal oxide and 0–5% F, as analyzed in weight percent, wherein $Al_2O_3$+$B_2O_3$ does not exceed 15%, $WO_3$+$MoO_3$ does not exceed 15%, and MgO+CaO+SrO+BaO+MnO does not exceed 20%.

6. The process as claimed in claim 1 wherein the zinc phosphate glass is within the composition range consisting essentially, expressed in terms of mole percent on the oxide basis, of 15–35% $P_2O_5$, 1–25% $SO_3$, 30–55% ZnO, 0–25% $R_2O$ wherein $R_2O$ is selected from the group consisting of 0–25% $Li_2O$, 0–25% $Na_2O$, and 0–25% $K_2O$, and up to a total of 15% of optional ingredients in the indicated proportions selected from the group consisting of 0–10% $Al_2O_3$, 0–10% MgO, 0–10% CaO, 0–10% SrO, 0–10% BaO, 0–10% MnO, 0–10% transition metal oxides and 0–15% Cl+F, as analyzed in weight percent.

7. The method of claim 1 wherein the resultant zinc hydrogen phosphates are a mixture of $ZnH_4P_2O_8 \cdot 2H_2O$ and $Zn(HPO_4) \cdot H_2O$.

* * * * *